United States Patent
Geller et al.

(10) Patent No.: US 9,754,411 B2
(45) Date of Patent: Sep. 5, 2017

(54) PATH PROXIMITY RENDERING

(75) Inventors: Dieter Geller, Aachen (DE); Helko Lehmann, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 1913 days.

(21) Appl. No.: 12/676,641

(22) PCT Filed: Sep. 11, 2008

(86) PCT No.: PCT/IB2008/053665
§ 371 (c)(1),
(2), (4) Date: Mar. 5, 2010

(87) PCT Pub. No.: WO2009/034535
PCT Pub. Date: Mar. 19, 2009

(65) Prior Publication Data
US 2010/0309199 A1 Dec. 9, 2010

(30) Foreign Application Priority Data
Sep. 13, 2007 (EP) .................................... 07116367

(51) Int. Cl.
*G06T 15/08* (2011.01)
*G06T 19/00* (2011.01)
*G06T 11/00* (2006.01)

(52) U.S. Cl.
CPC ............ *G06T 19/00* (2013.01); *G06T 11/003* (2013.01); *G06T 15/08* (2013.01)

(58) Field of Classification Search
None
See application file for complete search history.

(56) References Cited

U.S. PATENT DOCUMENTS 6,334,847 B1 * 1/2002 Fenster et al. ................ 600/443
6,480,732 B1 * 11/2002 Tanaka ................ A61B 8/5238
128/922
(Continued)

FOREIGN PATENT DOCUMENTS

JP 2006246941 A 9/2006
WO 2006099490 A1 9/2006

OTHER PUBLICATIONS

Viola et al: "Importance-Driven Volume Rendering"; IEEE Visualization Proceedings, Oct. 10-15, 2004, pp. 139-145.
(Continued)

*Primary Examiner* — Xiao Wu
*Assistant Examiner* — Steven Elbinger

(57) ABSTRACT

The invention relates to a system (100) for visualizing an object of interest comprised in a volume of an image dataset, the system comprising a path unit (110) for specifying a path in the volume of the image dataset on the basis of the object of interest, a location unit (120) for determining a location on a projection ray through the volume of the image dataset on the basis of the specified path, and a value unit (130) for computing a projected gray value corresponding to the projection ray on the basis of the determined location on the projection ray. Because the locations on the projection ray are determined based on the specified path for indicating the object of interest, the actual computation of the projection gray values may be designed and constructed to show gray values describing the object of interest while hiding gray values describing other objects, in particular occluding objects. Thus, the system of the invention is arranged for visualizing the object of interest at different viewing angles without occluding the object of interest.

15 Claims, 6 Drawing Sheets

(56) References Cited

U.S. PATENT DOCUMENTS

| | | | |
|---|---|---|---|
| 6,990,169 | B2 | 1/2006 | Claus et al. |
| 8,285,012 | B2 | 10/2012 | Kadomura et al. |
| 2004/0257375 | A1 | 12/2004 | Cowperthwaite |
| 2005/0099416 | A1 | 5/2005 | Moreau-Gobard et al. |
| 2005/0195189 | A1* | 9/2005 | Raman et al. ............... 345/424 |
| 2007/0103464 | A1* | 5/2007 | Kaufman ............. G06T 7/0012 345/424 |
| 2010/0309199 | A1 | 12/2010 | Geller et al. |

OTHER PUBLICATIONS

Kanistar et al: "Advanced Curved Planar Reformation: Flattening of Vascular Structures"; 2003 Proceedings of the 14th IEEE Visualization Conference (VIS'03), pp. 43-50.

Deschamps et al: "Fast Extraction of Minimal Paths in 3D Images and Applications to Virtual Endoscopy"; Medical Image Analysis, Oxford University Press, vol. 5, Jan. 1, 2001, pp. 281-299.

* cited by examiner

PATH PROXIMITY RENDERING

FIELD OF THE INVENTION

The invention relates to the field of volume image data visualization and more particularly to the field of projection-based visualization of an object of interest.

BACKGROUND OF THE INVENTION

For many years, methods like, e.g., Maximum Intensity Projection (MIP), Direct Volume Rendering (DVR), or Closest Vessel Projection (CVP) have been used to visualize volumetric, i.e., 3D, image datasets generated, e.g., by CT or MR scanners. These methods have the disadvantage that an object of interest to a user, e.g., a physician, may be occluded by other objects in many views, when the other objects are located in front of the object of interest. For example, peripheral arteries are often occluded by leg bones in rendered CT images even if contrast media are used during data acquisition. However, in order to determine the exact size and location of calcifications within a part of the vessel, it is crucial to view the vessel part from different angles. Another example is the identification and assessment of an aortic aneurysm. Aortic aneurysms are difficult to view as they are often occluded by the spine. In addition, even when some objects are in the background, behind the object of interest, the view of the object of interest would be often improved if the background could be removed.

The Curved Multi Planar Reformation (CMPR) method, an implementation of which is described, e.g., in "Advanced Curved Planar Reformation: Flattening of Vascular Structures", A. Kanitsar et al., IEEE Visualization 2002 Proceedings, Boston, Oct. 27-Nov. 1, 2002, Pages 43-50, uses a path that is either delivered by an automatic segmentation process or is indicated by hand by a physician. A slab with a constant predefined thickness enclosing this path is defined, thereby marking a region of interest of the volume data that is rendered. In this case the visualization depends on the quality of the extracted path. If the extracted path does not exactly follow the actual object of interest or parts of the path are missing, the rendering may exclude parts of the object of interest or include obstructing tissue, e.g., when the slab thickness must be increased to contain the complete object of interest.

Segmentation of the image dataset and delineating the object of interest or an obstructing object may help to eliminate the obstructing object from a view of the object of interest. Also, adjusting viewing parameters such as transfer functions can be helpful. Such methods are described in "Importance-driven volume rendering", I. Viola et al., IEEE Visualization 2004 Proceedings, Oct. 10-15, 2004, Page(s): 139-145. Unfortunately, fast and reliable segmentation methods are not always available. Also, eliminating an obstructing object by adjusting transfer function parameters is not always possible, especially when the object of interest and the obstructing object have similar gray values.

SUMMARY OF THE INVENTION

It would be advantageous to have an improved system for visualizing an object of interest at different viewing angles without objects being shown that occlude the object of interest.

To better address this issue, in an aspect of the invention, a system for visualizing an object of interest comprised in a volume of an image dataset is provided, the system comprising:

a path unit for specifying a path in the volume of the image dataset on the basis of the object of interest;

a location unit for determining a location on a projection ray through the volume of the image dataset on the basis of the specified path; and a value unit for computing a projected gray value corresponding to the projection ray on the basis of the determined location on the projection ray.

The path unit is arranged to receive an input, typically based on a user selection, for specifying the path. The path may comprise, for example, a point, a line segment, a polyline, or a curve, indicated by the user in the image dataset volume. Typically, the path is comprised in and/or is located near the volume of the object of interest. The path is used by the location unit to determine locations on the projection rays. These locations are used by the ray unit for computing the projection gray values for displaying on a display. Because the locations on the projection ray are determined based on the specified path for indicating the object of interest, the actual computation of the projection gray values may be designed and constructed to show gray values describing the object of interest while hiding gray values describing other objects, in particular occluding objects. Thus, the system of the invention is suitable for visualizing the object of interest at different viewing angles without showing objects occluding the object of interest.

It is a further advantage of the system of the invention that the specified path does not need to follow exactly the object of interest and does not need to be complete. In some cases, the path can be just a single point near the object of interest.

It is a further advantage of the system of the invention that the computation does not require image segmentation and thus can be performed much faster than if image segmentation is performed.

In an embodiment of the system, the location on the projection ray is further determined on the basis of the distance from the location to the specified path. For example, the location unit may be arranged for considering a location on the projection ray as a candidate for the determined location only if the distance of the candidate location from the specified path is less than a predetermined threshold. Thus, only candidate locations in or near the volume of the object of interest are taken into account. Objects in the distant background or foreground are not visualized in the rendered view. This may also accelerate determining the location on the projection ray. Further, this may make determining the location on the projection ray more robust, i.e., less prone to erroneously selecting a false location on the projection ray.

In an embodiment of the system, the location on the projection ray is further determined on the basis of a profile of gray values computed at a plurality of locations along the projection ray. The profile of gray values is a graph of the computed gray values vs. locations from the plurality of locations. Using the profile of gray values allows determining the location corresponding to a maximum of the profile, nearest to the path, for example. Other features of the profile, e.g., edge points (i.e., maxima or minima of the first derivative of the profile) may be also used.

In an embodiment of the system, the projected gray value is further determined on the basis of a reference gray value assigned to the object of interest. For example, only locations on the projection ray with computed gray values within a range of values specific to the object of interest may be taken into account by the location unit as candidates for determining the location on the projection ray.

In a further aspect of the invention, a method of visualizing an object of interest comprised in a volume of an image dataset is provided, the method comprising:
- a path step for specifying a path in the volume of the image dataset on the basis of the object of interest;
- a location step for determining a location on a projection ray through the volume of the image dataset on the basis of the specified path; and
- a value step for computing a projected gray value corresponding to the projection ray on the basis of the determined location on the projection ray.

In a further aspect of the invention, a computer program product to be loaded by a computer arrangement is provided, the computer program product comprising instructions for visualizing an object of interest comprised in a volume of an image dataset, the computer arrangement comprising a processing unit and a memory, the computer program product, after being loaded, providing said processing unit with the capability to carry out the tasks of:
- specifying a path in the volume of the image dataset on the basis of the object of interest;
- determining a location on a projection ray through the volume of the image dataset on the basis of the specified path; and
- computing a projected gray value corresponding to the projection ray on the basis of the determined location on the projection ray.

In a further aspect of the invention, the system according to the invention is comprised in an image acquisition apparatus.

In a further aspect of the invention, the system according to the invention is comprised in a workstation.

It will be appreciated by those skilled in the art that two or more of the above-mentioned embodiments, implementations, and/or aspects of the invention may be combined in any way deemed useful.

Modifications and variations of the image acquisition apparatus, of the workstation, of the method, and/or of the computer program product, which correspond to the described modifications and variations of the system, can be carried out by a skilled person on the basis of the present description.

The skilled person will appreciate that the method may be applied to multidimensional image data, e.g., to 3-dimensional or 4-dimensional images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

BRIEF DESCRIPTION OF THE DRAWINGS

These and other aspects of the invention will become apparent from and will be elucidated with respect to the implementations and embodiments described hereinafter and with reference to the accompanying drawings, wherein.

Identical reference numerals are used to denote similar parts throughout the Figures.

DETAILED DESCRIPTION OF EMBODIMENTS

Figure 1:
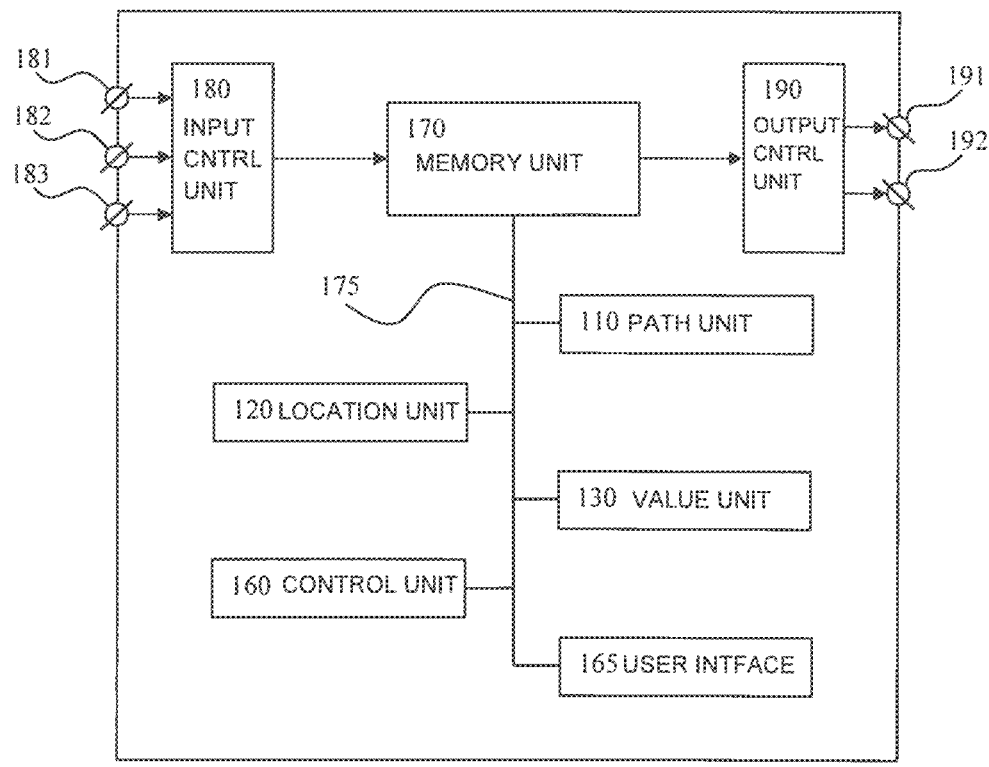
FIG. 1 schematically shows a block diagram of an exemplary embodiment of the system.

FIG. 1 schematically shows a block diagram of an exemplary embodiment of the system 100 for visualizing an object of interest comprised in a volume of an image dataset, the system comprising:
- a path unit 110 for specifying a path in the volume of the image dataset on the basis of the object of interest;
- a location unit 120 for determining a location on a projection ray through the volume of the image dataset on the basis of the specified path; and
- a value unit 130 for computing a projected gray value corresponding to the projection ray on the basis of the determined location on the projection ray.

The exemplary embodiment of the system 100 further comprises the following units:
- a control unit 160 for controlling the workflow in the system 100;
- a user interface 165 for communicating with a user of the system 100; and
- a memory unit 170 for storing data.

In an embodiment of the system 100, there are three input connectors 181, 182 and 183 for the incoming data. The first input connector 181 is arranged to receive data coming in from a data storage means such as, but not limited to, a hard disk, a magnetic tape, a flash memory, or an optical disk. The second input connector 182 is arranged to receive data coming in from a user input device such as, but not limited to, a mouse or a touch screen. The third input connector 183 is arranged to receive data coming in from a user input device such as a keyboard. The input connectors 181, 182 and 183 are connected to an input control unit 180.

In an embodiment of the system 100, there are two output connectors 191 and 192 for the outgoing data. The first output connector 191 is arranged to output the data to a data storage means such as a hard disk, a magnetic tape, a flash memory, or an optical disk. The second output connector 192 is arranged to output the data to a display device. The output connectors 191 and 192 receive the respective data via an output control unit 190.

The skilled person will understand that there are many ways to connect input devices to the input connectors 181, 182 and 183 and the output devices to the output connectors 191 and 192 of the system 100. These ways comprise, but are not limited to, a wired and a wireless connection, a digital network such as, but not limited to, a Local Area Network (LAN) and a Wide Area Network (WAN), the Internet, a digital telephone network, and an analog telephone network.

In an embodiment of the system 100, the system 100 comprises a memory unit 170. The system 100 is arranged to receive input data from external devices via any of the input connectors 181, 182, and 183 and to store the received input data in the memory unit 170. Loading the input data into the memory unit 170 allows quick access to relevant data portions by the units of the system 100. The input data may comprise, for example, the image dataset. The memory unit 170 may be implemented by devices such as, but not limited to, a Random Access Memory (RAM) chip, a Read Only Memory (ROM) chip, and/or a hard disk drive and a hard disk. The memory unit 170 may be further arranged to store the output data. The output data may comprise, for example, the image computed by the system 100 of the invention. The memory unit 170 may be also arranged to receive data from and/or deliver data to the units of the system 100 comprising the path unit 110, the location unit 120, the value unit 130, the control unit 160, and the user interface 165, via a memory bus 175. The memory unit 170 is further arranged to make the output data available to external devices via any of the output connectors 191 and 192. Storing data from the units of the system 100 in the memory unit 170 may advantageously improve performance of the units of the system 100 as well as the rate of transfer of the output data from the units of the system 100 to external devices.

Alternatively, the system 100 may comprise no memory unit 170 and no memory bus 175. The input data used by the system 100 may be supplied by at least one external device, such as an external memory or a processor, connected to the units of the system 100. Similarly, the output data produced by the system 100 may be supplied to at least one external device, such as an external memory or a processor, connected to the units of the system 100. The units of the system 100 may be arranged to receive the data from each other via internal connections or via a data bus.

In an embodiment of the system 100, the system 100 comprises a control unit 160 for controlling the workflow in the system 100. The control unit may be arranged to receive control data from and provide control data to the units of the system 100. For example, after specifying a path in the volume of the image dataset, the connection unit 130 may be arranged to provide control data "the path is specified" to the control unit 160, and the control unit 160 may be arranged to provide control data "determine a location on a projection ray through the volume of the image dataset on the basis of the specified path" to the location unit 140, thereby requesting the location unit 140 to determine said location. Alternatively, a control function may be implemented in another unit of the system 100.

In an embodiment of the system 100, the system 100 comprises a user interface 165 for communicating with the user of the system 100. The user interface 165 may be arranged to provide data for displaying an image computed from the image dataset and to obtain a user input for specifying the path. The user interface may further provide means for computing different views which are useful for specifying the path. The path may be a polyline defined by points indicated by the user, for example. Optionally, the user interface may receive a user input for selecting a mode of operation of the system such as, e.g., a way of computing the projected gray values. The skilled person will understand that more functions may be advantageously implemented in the user interface 165 of the system 100.

The value unit 130 is arranged to compute a projected gray value corresponding to the projection ray, on the basis of the determined location on the projection ray. To this end, the value unit 130 may be arranged to compute the gray value at the location on the projection ray, based on gray values of voxels comprised in the image dataset. In the simplest embodiment, the gray value at the location on the projection ray may be the gray value of the voxel comprising the location. Other methods may use gray values of the neighboring voxels to compute the projected gray value. The skilled person will understand that the scope of the claim should not be construed as limited by a choice of the method of computing the gray value at the location on the projection ray.

Figure 2:
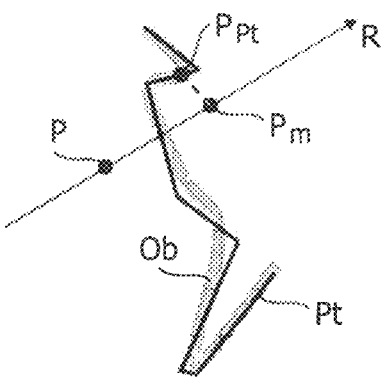
FIG. 2 illustrates the object of interest, the specified path, and a projection ray in the image dataset volume.

In an embodiment of the invention, a physician specifies a path near or inside the volume of an object of interest. FIG. 2 illustrates the object of interest Ob, the specified path Pt, and a projection ray R in the image dataset volume. For each point P on a projection ray R a function $d_{Pt}(R; P)$ is the distance of the point P to the path Pt. The distance of the point P to the path Pt may be defined as the distance from the point P to the closest point $P_{Pt}$ on the path Pt. Alternatively, $d_{Pt}(R; P)$ may be another function describing how the point P is located relative to the path Pt, e.g., a component of a vector from the point P to the closest point on the path Pt. The function $d_{Pt}(R; P)$ may have several minima and a global minimum. The global minimum of $d_{Pt}(R; P)$ for the ray R and path Pt corresponds to the point $P_m$ and is equal to the distance of the point $P_m$ to the closest point $P_{Pt}$ on the path Pt. In an embodiment of the system 100, the location defined by the point $P_m$ is the location determined by the location unit 120. Those skilled in the art will understand that other embodiments may use locations defined by a local minimum or several local minima, all locations on a ray segment between locations of two minima, or all locations P on the projection ray R for which the distance $d_{Pt}(R; P)$ is smaller than a threshold, for computing the projected gray value corresponding to the projection ray.

In an embodiment, the orthoprojection is used for image rendering, i.e., the projection rays are perpendicular to a viewing plane. Each ray may be defined by two coordinates (x, y) of a point on the viewing plane where the projection ray crosses the viewing plane. The position of a point P on the projection ray can be defined by the z coordinate of the point P, which is equal to the distance of the point P to the viewing plane. The z-axis of the reference system is defined in such a way that the z-coordinate is positive. Thus, the distance $d_{Pt}(R; P)$ can be expressed as $d_{Pt}(x, y; z)$. The z-coordinate of the point $P_m$ corresponding to the absolute minimum of the distance function $d_{Pt}(x, y; z)$ is denoted as $z_m$.

In an embodiment of the system 100, tissue-specific gray value information about the object of interest is used by the value unit 130 for computing the projected gray values. The acquisition-specific information about the gray value range of the object of interest voxels may be described by a function o(v) mapping the gray values v, which belong to said range, to themselves. For example, the function o(v) may be defined by a gray value threshold T: all gray values smaller than the threshold are assigned 0, i.e., o(v)=0 for v<T, all gray values greater than or equal to the threshold T are assigned the same gray values, i.e., o(v)=v for v≥T. In other words, o(v) is an identity function for v≥T and a constant 0 function for v<T.

For each viewing ray R defined by the coordinates (x, y), the functions $z \rightarrow d_{Pt}(x, y; z)$ and $z \rightarrow o(v(x, y, z))$, where v(x, y, z) is the gray value computed at the location (x, y, z) in the image dataset volume on the basis of the voxel gray values (e.g., the gray value of the voxel comprising the location (x, y, z)), provide two measures describing, respectively, the proximity of the location (x, y, z) to the specified path Pt, i.e., also to the object of interest, and the similarity of the tissue at the location (x, y, z) to the tissue of the object of interest. Based on this information, a standard rendering technique such as, but not limited to, MIP, minimum intensity projection (mIP), average intensity projection (AIP), DVR, and Digital Reconstructed Radiograph (DRR), may be applied to compute the projected gray value, using only those parts of the ray which are close to the object of interest and have gray values in the gray value range of the object of interest.

Figure 3A:
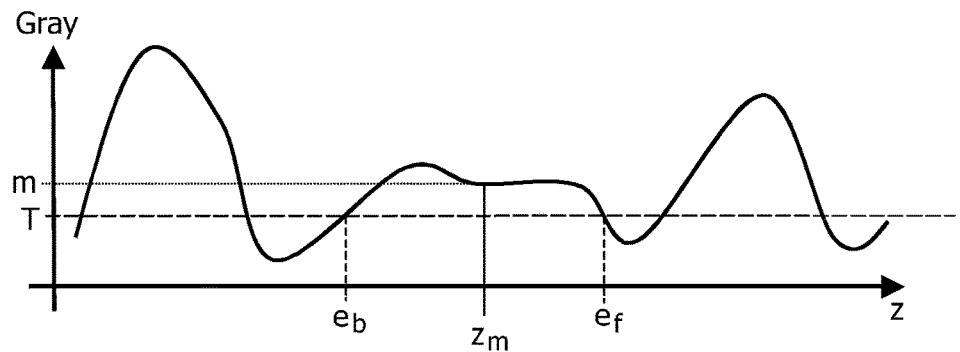
FIG. 3 illustrates an implementation of computing the projected gray values.

In an embodiment of the system 100, the coordinate $z_m$ of the location (x, y, $z_m$) of the absolute minimum of the function $z \rightarrow d_{Pt}(x, y; z)$ is found. FIG. 3 illustrates an implementation of computing the projected gray values. If $m=v(x, y, z_m) \geq T$, as shown in FIG. 3a, an interval $I=[e_b, e_f]$ defining locations (x, y, z) for computing the projected gray value is defined as follows:

$e_b$ is the smallest number such that $v(x, y, z) \geq T$ for every z $\in [e_b, z_m]$; and $e_f$ is the largest number such that $v(x, y, z) \geq T$ for every z $\in [z_m, e_f]$.

Figure 3B:
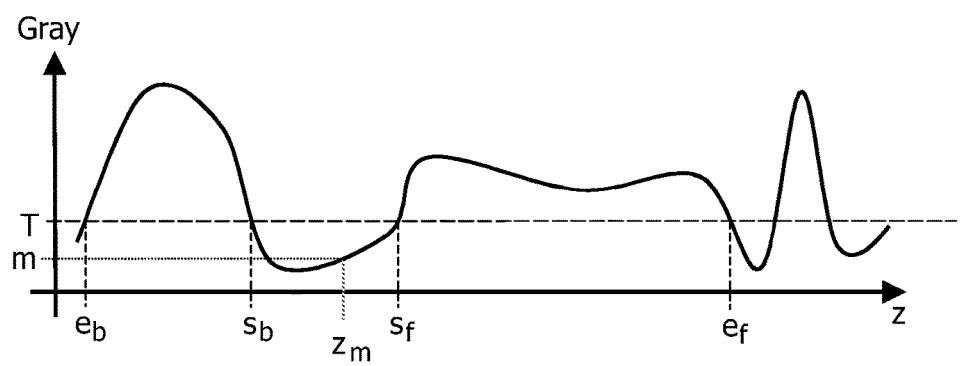

If $m=v(x, y, z_m) < T$, as shown in FIG. 3b, an interval $[e_b, e_f]$ defining locations (x, y, z) for computing the projected gray value is defined as follows:

$s_b$ is the smallest number such that $v(x, y, z) < T$ for every z $\in (s_b, z_m]$;

$e_b$ is the smallest number such that $v(x, y, z) \leq T$ for every z $\in [e_b, s_b]$;

$s_f$ is the largest number such that $v(x, y, z) < T$ for every z $\in [z_m, s_f)$; and $e_f$ is the largest number such that $v(x, y, z) \leq T$ for every z $\in [s_f, e_f]$.

Alternatively, if $m=v(x, y, z_m) < T$, the interval $[e_b, s_b]$ may be used for computing the projected gray value when $z_m < (s_b + s_f)/2$ or the interval $[s_f, e_f]$ may be used for computing the projected gray value when $z_m \leq (s_b + s_f)/2$.

Figure 4:
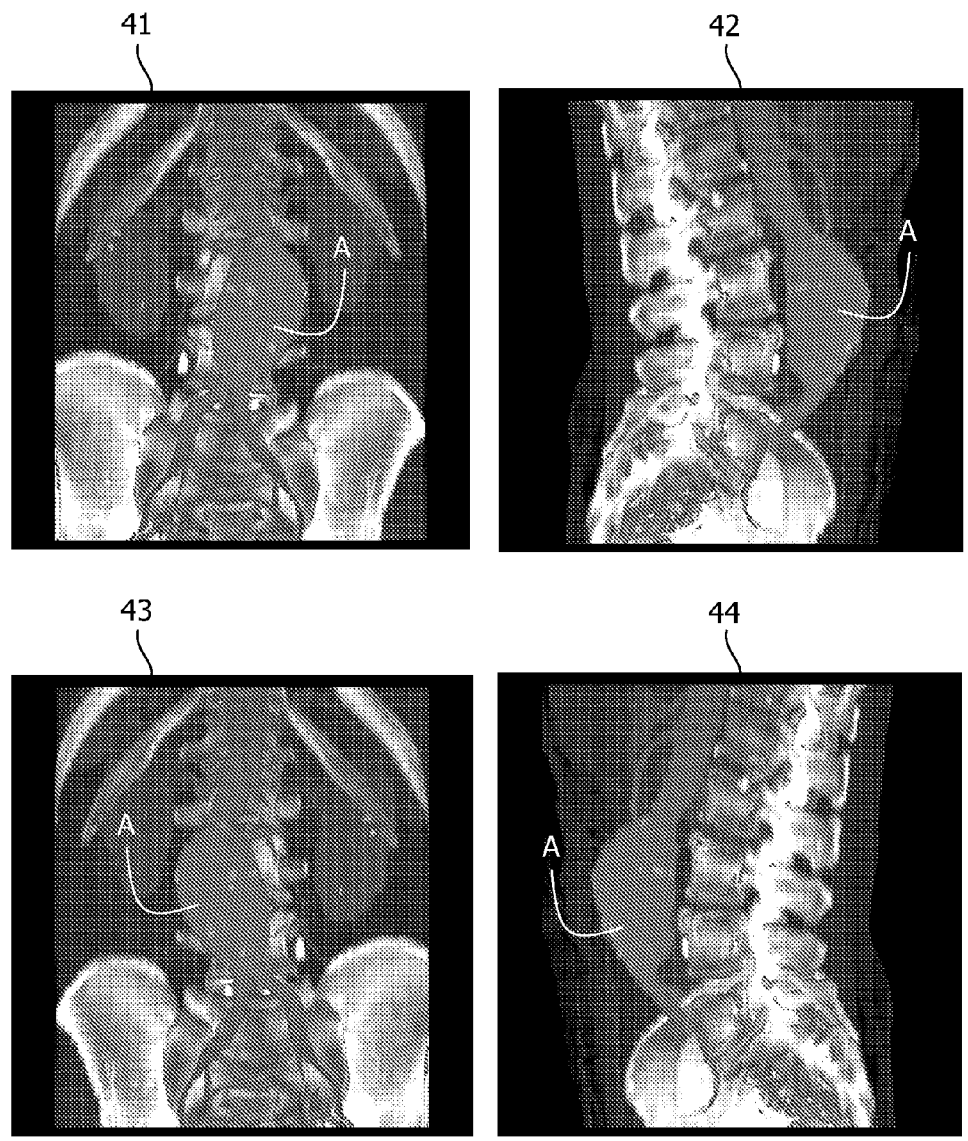
FIG. 4 shows different views of an exemplary object of interest unobstructed by other objects comprised in the image dataset volume, computed using the system of the invention.

FIG. 4 shows different views of an exemplary object of interest unobstructed by other objects comprised in the image dataset volume, computed using the system 100 of the invention. The exemplary object of interest A is an aortic aneurysm. The four views 41, 42, 43, and 44 of the aortic aneurysm show the object of interest A at arbitrary viewing angles of 0, 90, 180, and 270 degrees, respectively. The potentially view-occluding structures include the vertebrae, ribs, ilium, and sacrum. At each view, the objects which are in front of the aortic aneurysm are not visualized.

The skilled person will appreciate that the system 100 may be a valuable tool for assisting a physician in many aspects of her/his job.

Those skilled in the art will further understand that other embodiments of the system 100 are also possible. It is possible, among other things, to redefine the units of the system and to redistribute their functions. Although the described embodiments apply to medical images, other applications of the system, not related to medical applications, are also possible.

The units of the system 100 may be implemented using a processor. Normally, their functions are performed under the control of a software program product. During the execution, the software program product is normally loaded into a memory, like a RAM, and executed from there. The program may be loaded from a background memory, such as a ROM, hard disk, or magnetic or optical storage, or may be loaded via a network like the Internet. Optionally, an application-specific integrated circuit may provide the described functionality.

Figure 5:
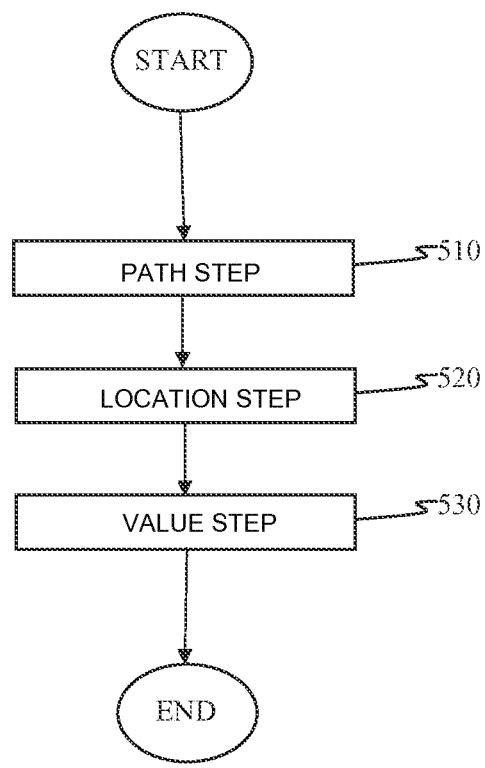
FIG. 5 shows a flowchart of an exemplary implementation of the method.

FIG. 5 shows a flowchart of an exemplary implementation of the method 500 of visualizing an object of interest comprised in a volume of an image dataset. The method 500 begins with a path step 510 for specifying a path in the volume of the image dataset on the basis of the object of interest. After the path step 510, the method 500 continues to a location step 520 for determining a location on a projection ray through the volume of the image dataset on the basis of the specified path. After the location step 520, the method 500 continues to a value step 530 for computing a projected gray value corresponding to the projection ray on the basis of the determined location on the projection ray. After computing the projected gray values for each projection ray, the method 500 terminates.

The skilled person may change the order of some steps or perform some steps concurrently, using threading models, multi-processor systems or multiple processes without departing from the concept as intended by the present invention. Optionally, two or more steps of the method of the current invention may be combined into one step. Optionally, a step of the method of the current invention may be split into a plurality of steps.

Figure 6:
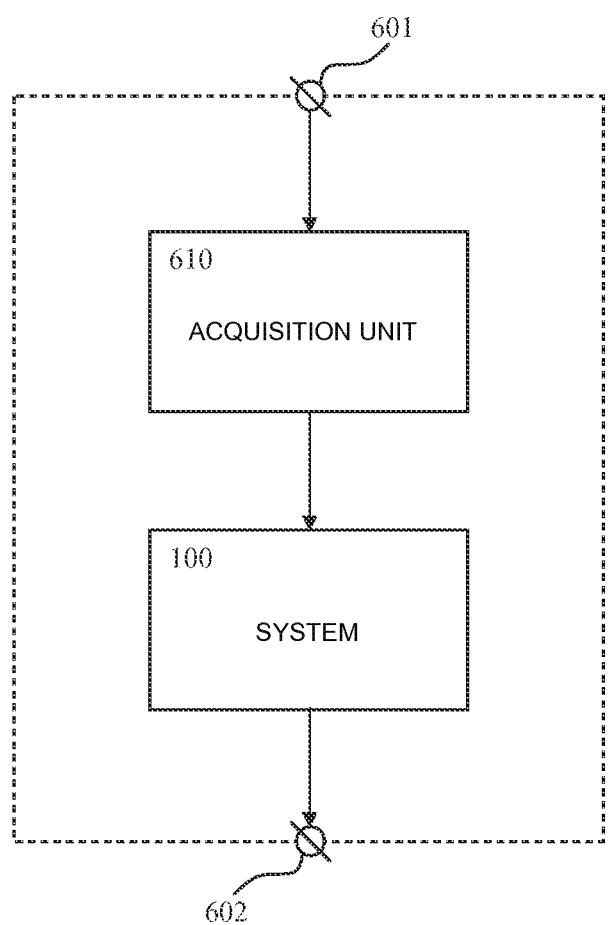
FIG. 6 schematically shows an exemplary embodiment of the image acquisition apparatus.

FIG. 6 schematically shows an exemplary embodiment of the image acquisition apparatus 600 employing the system 100, said image acquisition apparatus 600 comprising a CT image acquisition unit 610 connected via an internal connection with the system 100, an input connector 601, and an output connector 602. This arrangement advantageously increases the capabilities of the image acquisition apparatus 600, providing said image acquisition apparatus 600 with advantageous capabilities of the system 100.

Figure 7:
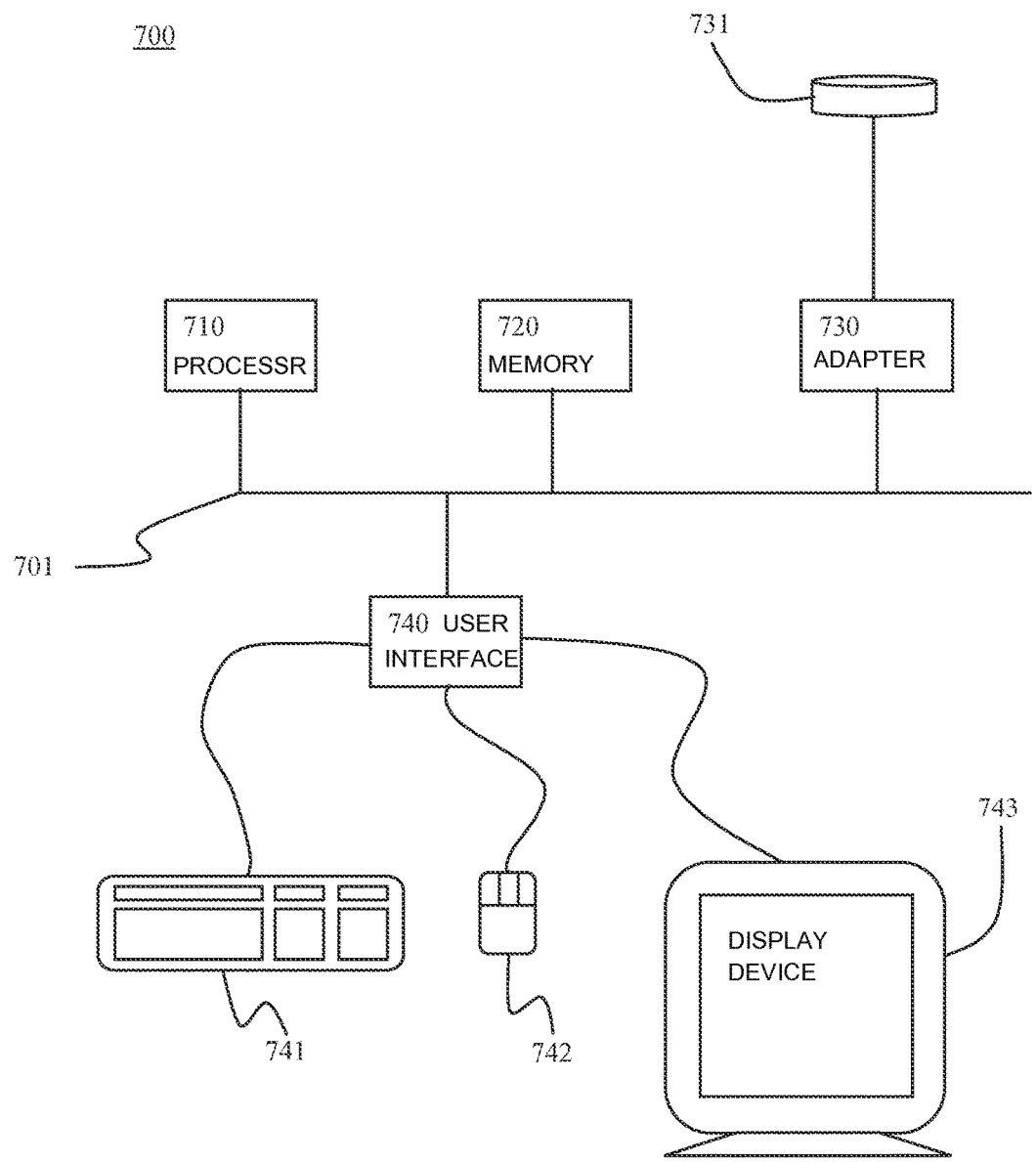
FIG. 7 schematically shows an exemplary embodiment of the workstation.

FIG. 7 schematically shows an exemplary embodiment of the workstation 700. The workstation comprises a system bus 701. A processor 710, a memory 720, a disk input/output (I/O) adapter 730, and a user interface (UI) 740 are operatively connected to the system bus 701. A disk storage device 731 is operatively coupled to the disk I/O adapter 730. A keyboard 741, a mouse 742, and a display 743 are operatively coupled to the UI 740. The system 100 of the invention, implemented as a computer program, is stored in the disk storage device 731. The workstation 700 is arranged to load the program and input data into memory 720 and execute the program on the processor 710. The user can input information to the workstation 700, using the keyboard 741 and/or the mouse 742. The workstation is arranged to output information to the display device 743 and/or to the disk 731. The skilled person will understand that there are numerous other embodiments of the workstation 700 known in the art and that the present embodiment serves the purpose of illustrating the invention and must not be interpreted as limiting the invention to this particular embodiment.

It should be noted that the above-mentioned embodiments illustrate rather than limit the invention and that those skilled in the art will be able to design alternative embodiments without departing from the scope of the appended claims. In the claims, any reference signs placed between parentheses shall not be construed as limiting the claim. The word "comprising" does not exclude the presence of elements or steps not listed in a claim or in the description. The word "a" or "an" preceding an element does not exclude the presence of a plurality of such elements. The invention can be implemented by means of hardware comprising several distinct elements and by means of a programmed computer. In the system claims enumerating several units, several of these units can be embodied by one and the same item of hardware or software. The usage of the words first, second, third, etc., does not indicate any ordering. These words are to be interpreted as names.

The invention claimed is:

1. A system for visualizing an object of interest comprised in a volume of an image dataset, the system comprising:
   a memory configured to store the volume of the image dataset; and
   a processor configured to:
      receive an input indicative of a path near the object of interest in the volume of the image dataset;
      specify the path in the volume of the image dataset;
      determine, for each point on each projection ray in the volume of the image dataset, a distance to the path;

determine, for each projection ray in the volume of the image dataset, a point with a shortest distance to the path as a point of interest;

create a viewing plane, which is orthogonal to the projection rays and the projection rays intersect and traverse through the viewing plane;

determine, for the point of interest of each projection ray in the volume of the image dataset, a distance to the viewing plane;

identify, for the point of interest of each projection ray in the volume of the image dataset, a gray value;

replace, for the point of interest of each projection ray in the volume of the image dataset, the gray value with a value of zero only in response to the gray value being below a predetermined threshold;

compute a projected gray value for each pixel at the viewing plane based on the distance to the viewing plane and the gray value; and render the object of interest in the viewing plane using the computed projected gray values.

2. The system of claim 1, wherein the processor, for each projection ray in the volume of the image dataset, determines a global minimum as the point of interest.

3. The system of claim 1, wherein the processor, for each projection ray in the volume of the image dataset, determines local minima and selects a local minimum from the local minima as the point of interest.

4. The system of claim 1, wherein the processor, for each projection ray in the volume of the image dataset, determines the point of interest from segments between two local minima.

5. The system of claim 1, wherein the processor, for each projection ray in the volume of the image dataset, determines the point of interest based on all points on the ray with a distance below a predetermined threshold distance.

6. The system of claim 1, wherein the processor determines the predetermined threshold based on a gray value of the object of interest.

7. The system of claim 1, wherein the processor determines the predetermined threshold based on predetermined range around a gray value of the object of interest.

8. The system of claim 1, wherein the processor determines the distance to the viewing plane based on a component of a vector from the point to a closest point on the path.

9. The imaging system according to claim 1, wherein the volume of the image dataset is generated by one of a Computed Tomography imaging system; a Positron Emission Tomography imaging system; a Magnetic Resonance imaging system; a Single Photon Emission Computerized Tomography imaging system.

10. The imaging system according to claim 1, wherein the processor renders the object of interest in the viewing plane using at least one of maximum intensity projection, minimum intensity projection, average intensity projection, digital volume rendering, or digital reconstructed radiograph.

11. The system of claim 1, wherein, for each projection ray in the volume of the image dataset, local minima are determined and a local minimum from the local minima is selected as the point of interest.

12. The system of claim 1, wherein, for each projection ray in the volume of the image dataset, the point of interest is determined from segments between two local minima.

13. The system of claim 1, wherein, for each projection ray in the volume of the image dataset, the point of interest is determined based on all points on the ray with a distance below a predetermined threshold distance.

14. A computer-implemented method for visualizing an object of interest comprised in a volume of an image dataset, the computer-implemented method comprising:

storing the volume of the image dataset in a memory;

receiving an input indicative of a path near the object in the volume of the image dataset;

specifying the path in the volume of the image dataset;

determining, for each point on each projection ray in the volume of the image dataset, a distance to the path;

determining, for each projection ray in the volume of the image dataset, a point with a shortest distance to the path as a point of interest;

construct a viewing plane that is orthogonal to the projection rays and the projection rays interest and traverse through the viewing plane;

determining, for the point of interest of each projection ray in the volume of the image dataset, a distance to the viewing plane;

determining, for the point of interest of each projection ray in the volume of the image dataset, a reference gray value, wherein the reference gray value for the point of interest is replaced with a value of zero in response to the reference gray value being below a predetermined threshold and maintained in response to the reference gray value being equal to or greater than the predetermined threshold;

computing a projected gray value for each pixel of the viewing plane based on the distance to the viewing plane and the corresponding reference gray value; and rendering the object of interest in the viewing plane using the computed projected gray values.

15. The computer-implemented method of claim 14, wherein, for each projection ray in the volume of the image dataset, a global minimum is determined as the point of interest.

* * * * *